June 15, 1965 E. T. PLATZ ETAL Re. 25,798
PLUG-IN CONNECTOR
Original Filed Dec. 28, 1956 2 Sheets-Sheet 1
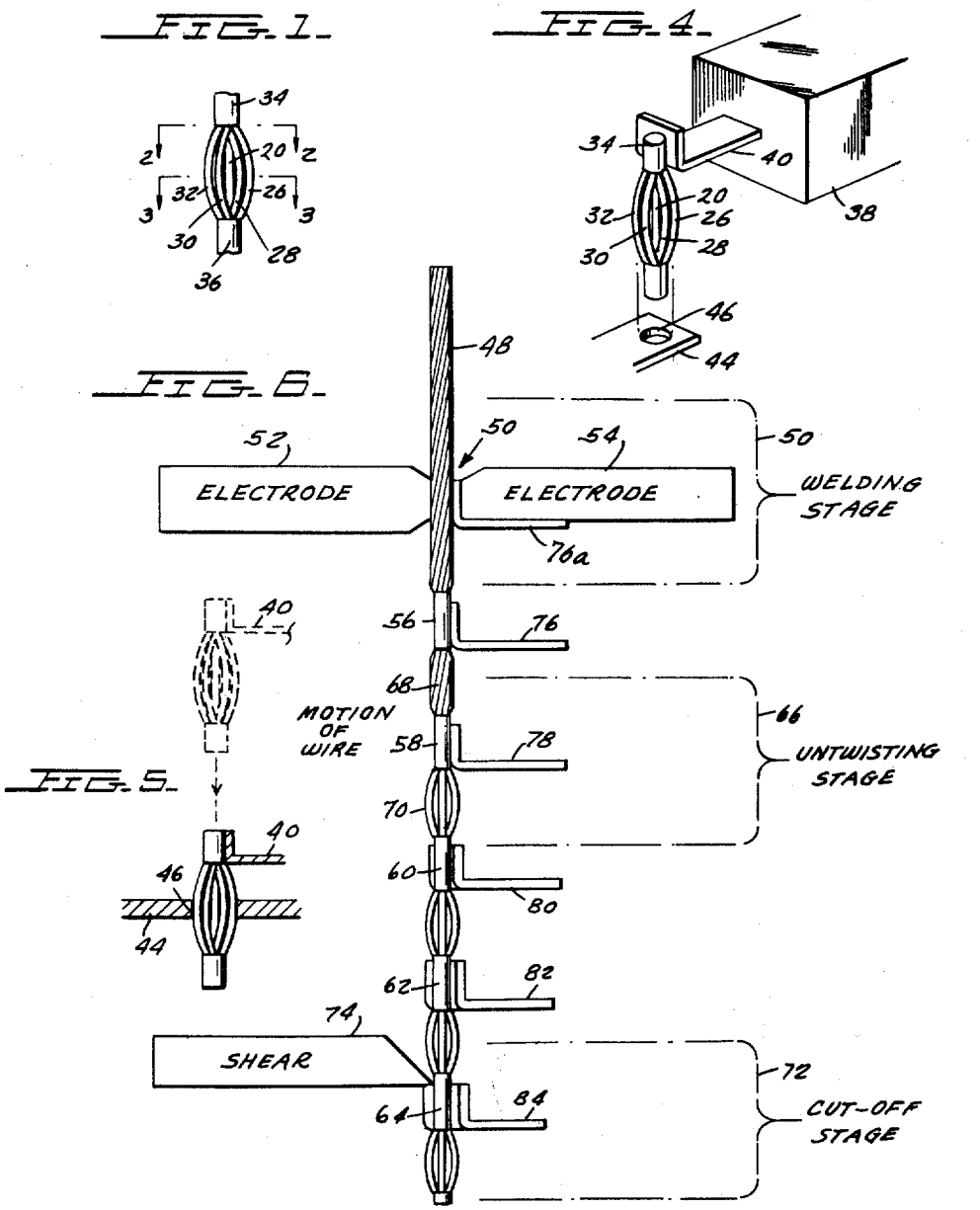
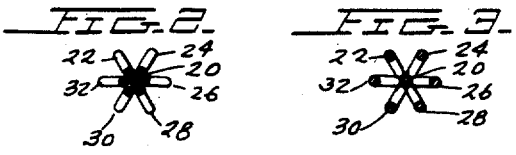
INVENTORS
WILLIAM H. FRANK
ELWOOD T. PLATZ
BY Smyth, Roston & Pavitt
ATTORNEYS

PLUG-IN CONNECTOR

Original Filed Dec. 28, 1956 2 Sheets-Sheet 2

INVENTORS:
William H. Frank
Elwood T. Platz
By Smyth, Roston & Pavitt
Attorneys

United States Patent Office

Re. 25,798
Reissued June 15, 1965

25,798
PLUG-IN CONNECTOR

Elwood T. Platz, Grosse Pointe Farms, and William H. Frank, Detroit, Mich., assignors, by mesne assignments, to New Twist Connector Corporation, Santa Monica, Calif., a corporation Original No. 3,017,605, dated Jan. 16, 1962, Ser. No. 631,090, Dec. 28, 1956. Application for reissue June 14, 1963, Ser. No. 288,065
8 Claims. (Cl. 339—252)

Matter enclosed in heavy brackets [ ] appears in the original patent but forms no part of this reissue specification; matter printed in italics indicates the additions made by reissue.

Our invention relates to a novel male plug-in connector of the bayonnet or stab type and to a novel method of manufacture of this male plug-in connector.

In the past, male plug-in connectors of small size utilized spring type devices for obtaining contact pressure and were difficult to manufacture. Thus, connectors of this type have usually relied on the temper of the material employed to obtain the required self-biasing effect for achieving the required contact pressure. Even this, however, has been difficult since it is usually necessary to utilize a non-ferrous type of material to achieve the desired electrical conductivity, these materials usually being relatively low in mechanical strength.

The primary object of our invention is to provide a compact, rugged and low cost connector that can be made of inexpensive non-ferrous metal of good conductivity which lends itself to simple manufacturing techniques and has adequate mechanical strength for providing necessary flexibility to achieve the required mechanical contact pressure.

In essence our novel plug-in connector is comprised of a plurality of strands of conducting wire which could be of a copper alloy material wherein a center strand *or axial core* is surrounded by a plurality of external strands. Each of these strands are fastened together or joined by welding or any other desired means at specific points, the center strand being shorter than the strands surrounding the center strand. Accordingly, the central strand is placed in tension and the external strands in compression and the external strands will bow out at their center so that the length between their two ends will be the same as that of the shorter center strands. Hence the outer strands of our novel plug-in connector which are inexpensive and of a high conductivity material, may serve as self-biased spring members when inserted into a cooperating female type connector. That is to say, since the strands are bowed outwardly, they are forced towards the center strand when being plugged into a female connector having a diameter which is less than the diameter formed by the bowed strands and there will be mechanical stresses set up in the bowed strands causing a strong contact engagement with respect to the internal surfaces of the female connector.

One novel method by which our novel plug-in connector can be manufactured is to take a length of spirally twisted strands which surround a central strand and to weld the strands together at predetermined lengths along the length of the bundle of strands to form a plurality of connectors having a length determined by the distance between the welded points. After welding, the bundle of strands may then be unravelled [so that each of the strands are substantially parallel to the central strand] whereby the length of the external strands will exceed the length of the center strand and therefore bow outwardly to form our novel plug-in connector. *The bundle may be unravelled to the degree that the outer strands are substantially parallel to the central strand or the bundle may be unravelled to lesser degree to make the*

*outer stands helical in configuration.* The connectors may then be cut at their welded points so as to form male connectors which can be subsequently fastened to electrical apparatus in any desired manner.

Accordingly, the primary object of our invention is to provide a novel male plug-in connector.

A still further object of our invention is to provide the novel male plug-in connector which is formed of a plurality of compression stressed strands positioned about a central tension stressed strand wherein each of the plurality of strands and central strand are welded at each end with the central strand being shorter than the external strands so as to cause the external strands to bow outwardly.

Still another object of our invention is to provide a novel method of manufacture of a male plug-in connector wherein a plurality of strands are first wound around a center strand and are welded thereto at a first and second point and the strands are thereafter unwound whereby the strands surrounding the center strand will be forced to bow outwardly.

Another object of our invention is to provide a novel male plug-in conductor which is inexpensive and simple in construction.

A still further object of our invention is to provide a novel male connector which affords multiple contact surfaces around its circumference.

These and other objects of our invention will become apparent when taken in connection with the drawings and the following description in which:

FIGURE 1 is a side view of *one embodiment of* our novel invention.

FIGURE 2 is a cross-sectional view of FIGURE 1 when taken across the lines 2—2.

FIGURE 3 is a cross-sectional view of FIGURE 1 when taken along the lines 3—3.

FIGURE 4 shows one application of our novel invention in a perspective view with the plug-in connector of one electrical component about to be plugged into a cooperating female connector.

FIGURE 5 shows a side cross-sectional view of a portion of FIGURE 4 where our novel plug-in connector is shown in dotted lines in a disengaged position and in solid lines in the engaged position.

FIGURE 6 is a diagram illustrating the manufacture of [our novel] *the* plug-in connector.

Figure 7:
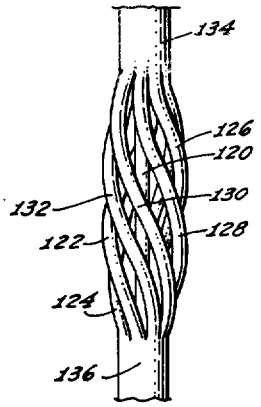
*FIGURE 7 is a side view of another embodiment of the invention.*

Referring now to the FIGURES 1, 2 and 3 it is seen that our novel plug-in connector is comprised of a central conducting strand 20 which is encompassed by a plurality of encompassing strands 22, 24, 26, 28, 30 and 32, wherein the strands 22 through 32 run in a direction which is substantially parallel to the central conducting strand *or axial core* 20. Each of the strands is then connected at a first and second axially displaced point 34 and 36, respectively, by welding or by any other desired fastening means. Strand 20, however, is constructed, as will be seen hereinafter with reference to FIGURE 6, to have a shorter length between points 34 and 36 than at least one of and preferably all of the encompassing strands 22 through 32. Hence, the strands 22 through 32, in view of their longer length, will be forced to bow outwardly as seen in FIGURE 1.

It is to be clearly noted that while the embodiment of FIGURES 1, 2 and 3 show our novel invention when utilizing six encompassing strands that any number of encompassing strands could be utilizied.

One application of our novel plug-in connector is set forth in FIGURE 4 where a piece of electrical apparatus schematically illustrated as block 38 has an electrical terminal 40 extending out therefrom. The electrical apparatus 38 could be any type of apparatus utilizing plug-in connectors and their terminals. A plug-in connector of the type of FIGURE 1 is fastened to the output terminal 40 at the point 34 by means of welding or any desired clamping so that the plug-in connector is rigidly fastened in electrical and mechanical contact to the terminal 40. The electrical apparatus 38 may then be connected to an associated piece of electrical apparatus or a line conductor or load conductor 44 which has an aperture 46 therein which forms a cooperating female plug-in connector.

In the disengaged position as shown in FIGURE 5 which is a side view of FIGURE 4, the encompassing strands 26, 28, 30, 32 as well as the strands not shown in this figure are bowed out to an outer diameter which is determined by the difference between these encompassing strands and the length of the central conductor. When, however, they are moved to the engaged position and inserted in aperture 46 as shown in the solid view of FIGURE 5 the strands are forced inwardly so as to set up internal stresses which operate as biasing forces to bias each individual strand into friction contact engagement with at least a portion of the inner periphery of aperture 46 to thereby form a good electrical connection between terminal 40 and terminal 44.

[It is to be noted that while] *The described embodiment of* the plug-in connector [set forth herein is a preferred embodiment, it] shows the encompassing strands as being substantially parallel to the center strand. [The] *A second embodiment shows* encompassing strands [could still be] *as* helical in configuration with respect to the center strands[,] . *In both embodiments* the only limitation [being] *is* that the length of the helical strand, when measured to the axis of the helix, is longer than the length of the central restraining strand which keeps the encompassing strands in their bowed position.

In manufacturing *the first embodiment of* our novel plug-in connector an elongated stranded conductor 48 (FIGURE 6) which comprises a plurality of encompassing strands surrounding a central strand is positioned to be fed, as is shown in FIGURE 6, in a downwardly position so that it will first pass the welding stage indicated generally at 50 wherein a first and second electrode 52 and 54, respectively, engage either side of stranded conductor 48 to pass a high current therethrough in any of many well known manners whereby each of the plurality of encompassing strands and the central strand will be welded together. Thus, in FIGURE 6 points 56, 58, 60, 62 and 64 have been previously welded. The wire then moves into an untwisting stage 66 where for the case of stranded conductor 48 the conductor is unraveled in a clockwise direction so that the encompassing strands at portion 68, between welding portions 56 and 58, will be unraveled and, because of the central strand, will be forced to bow out as is seen for portion 70 which has already been unraveled. The unraveled strands then move further in a downwardly direction and into a cut-off stage 72 wherein a shear 74 is brought into engagement with welded portion 64 to cause a shearing thereof and production of a single plug-in connector of our novel invention.

It is to be noted that the mechanism utilized in either the welded stage 50, the untwisted stage 66 or the cut-off stage 72 could be of any of many well known structures and will not be set forth herein.

While FIGURE 6 sets forth a method of construction wherein the encompassing wires are untwisted at untwisting stage 66 so that the encompassing wires will lie in a direction which is substantially parallel to the direction of the center strand. The wires could be untwisted to an extent where they will still form a helix, having a portion of the helix biased into contact engagement with a mating connector, without departing from our novel invention. *Such an embodiment with helical outer wires is described later.*

If desired, the terminal conductor can be welded to its respective connector at the same time the strands are welded together. Thus, in FIGURE 6, it is seen that terminal 76a is positioned between electrode 54 and stranded conductor 48 and is welded to the conductor at the same time the strands are welded together.

As a result of this process, point 58 has terminal 78 welded thereto and similarly terminals 80, 82 and 84 have been welded at points 60, 62 and 64, respectively.

The terminals 76, 78, 80, 82 and 84 can be advantageously used in the untwisting stage 66 if desired, since they will act as levers with one maintained stationary and the other rotated. By way of example, conductor 70 which is in the untwisting stage in FIGURE 6 could pass through any desired mechanism whereby terminal 78 is maintained stationary while terminal 80 is rotated into the plane of the drawing to the position shown to thereby untwist the outer strands of the conductor.

*FIGURE 7 illustrating the second embodiment of the invention shows a plug-in connector comprised of a central conducting strand or axial core 120 which is encompassed by a plurality of strands 122, 124, 126, 128, 130 and 132, wherein the strands 122 through 132 are of helical configuration, all being inclined in the same circumferential direction. Each of the strands is then connected at first and second axially displaced points 134 and 136, respectively, by welding or by any other desired fastening means. Strand 120, however, is constructed, as will be seen hereinafter with reference to FIGURE 8, to have a shorter length between points 134 and 136 than at least one of and preferably all of the encompassing strands 122 through 132. Hence, the strands 122 through 132, in view of their longer length, are forced to bow outwardly as seen in FIGURE 7.*

*It is to be clearly noted that while the embodiment shown in FIGURE 7 utilizes six encompassing strands, nevertheless, any number of encompassing strands may be used.*

Figure 8:
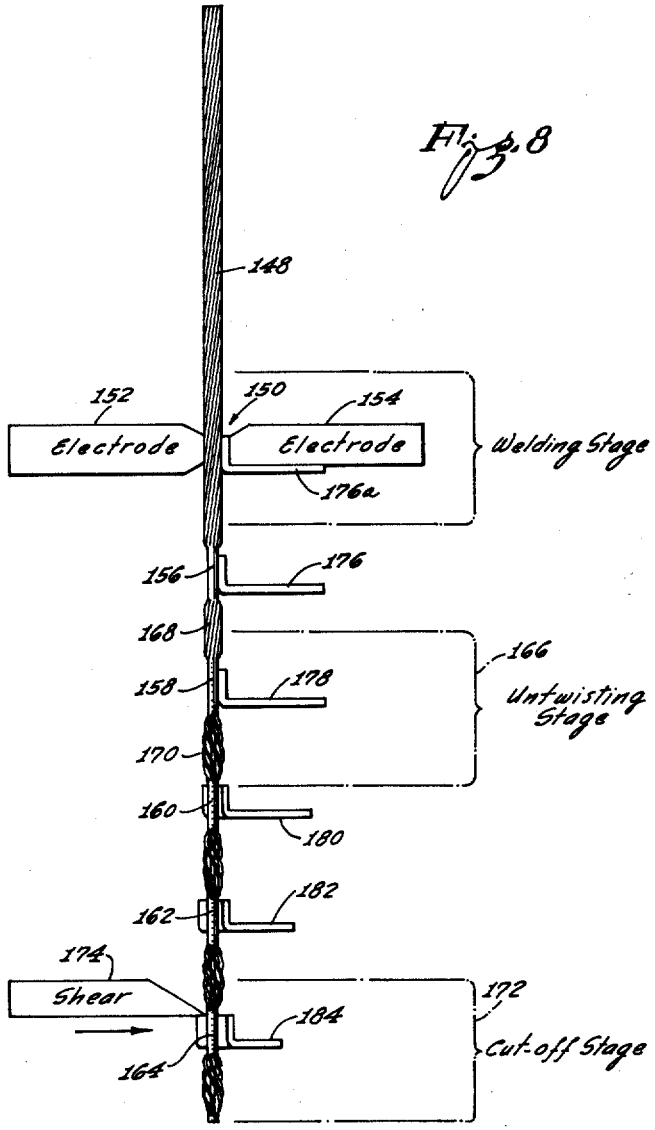
*FIGURE 8 is a diagram similar to FIGURE 6 illustrating the manufacture of the second embodiment of the invention.*

*The plug-in connector of the second embodiment of the invention shown in FIGURE 7 may be manufactured in the previously described manner by employing a previously described elongated stranded conductor 148 as shown in FIGURE 8. The stranded conductor 148 comprises a plurality of encompassing strands surrounding a central strand and is positioned to be fed, as shown in FIGURE 8, in a downward position so that it will first pass the welding stage indicated at 150 wherein a first and second electrode 152 and 154, respectively, engage either side of the stranded conductor 148 to pass a high current therethrough in any of many well known manners whereby each of the plurality of encompassing strands and the central strand will be welded together. Thus, in FIGURE 8 points 156, 158, 160, 162 and 164 have been previously welded. The wire then moves into an untwisting stage 166 where the stranded conductor 148 is unravelled in a clockwise direction so that the encompassing strands at portion 168, between welding portions 156 and 158, will be unravelled and, because of the central strand, will be forced to bow out as seen for portion 170 which has already been unravelled to the desired degree. It is to be noted that the desired degree of unravelling is substantially less than the degree of unravelling shown in FIGURE 6 so that the encompassing strands are helical in configuration instead of lying in longitudinal planes that extend radially of the axis of the central strand. The encompassing strands are initially helical before the unravelling operation and in effect the unravelling or untwisting operation reduces the number of turns of each of the helical strands to cause corresponding radial expansion of the helical strands. The partially unravelled strands then move further in a downward direction and into a cut-off stage 172 wherein a shear 174 is brought*

*into engagement with welded portion 164 to cause a shearing thereof and production of a single plug-in connector.*

*Here again, if desired, the terminal conductor can be welded to its respective connector at the time the strands are welded together. Thus, in FIGURE 8 it is seen that terminal 176a is positioned between electrode 154 and stranded conductor 148 and is welded to the conductor at the same time the strands are welded together. As a result of this process, point 156 has terminal 176 welded thereto and similarly terminals 158, 160, 162 and 164 have been welded at points 178, 180, 182 and 184, respectively.*

In the foregoing we have described our invention solely in connection with specific illustrative embodiments thereof. Since many variations and modifications of my invention will now be obvious to those skilled in the art, I prefer to be bound not by the specific disclosures herein contained, but only by the appended claims.

We claim:

1. A male plug-in connector adapted to be constructed from wire having a plurality of outer conducting stands helically wound about a central strand, said connector comprising a plurality of conducting strands encompassing a central strand; said plurality of conducting strands being fixedly secured directly to said central strand at a first and a second point along the axis of said connector; said central strand being of shorter length than said encompassing strands, said encompassing strands being bowed outwardly to form a cage about said central strand; the outer periphery of said cage formed about said central strand being frictionally engageable with at least a portion of the inner surface of a cooperating female type connector with said central strand comprising a reference for biasing forces urging the encompassing strands outward.

2. The male plug-in connector of claim 1 in which each of said conducting strands is of substantially uniform cross-sectional area throughout the length thereof.

3. The male plug-in connector of claim 2 in which the central strand and each of the encompassing strands are of substantially the same cross-sectional area.

4. The male plug-in connector of claim 2 in which each of the strands are of circular cross-section.

*5. The male plug-in connector of claim 1 in which said encompassing strands are of helical configuration.*

*6. A pin connector to fit into a cooperating socket connector, comprising: a longitudinal core; and a cluster of resiliently flexible wires formed helically around the core, the opposite ends of the wires of the cluster being fixedly secured to the core and the intermediate portions of the wires of the cluster being bowed radially outward from the core to permit resilient radial contraction of the cluster by the cooperating socket connector.*

*7. A pin connector as set forth in claim 6 in which the wires of the cluster are biased to tend to extend the length of the cluster beyond the length of the cluster that is maintained by the core, the wires of the cluster being permanently stressed with opposed tensioning of the core for resistance to radial contraction of the cluster.*

*8. A pin connector to fit into a cooperating socket connector, comprising: a longitudinal core; and a cluster of resiliently flexible wires formed helically around the core, the opposite ends of the wires of the cluster being fixedly secured to the core, the length of the core between its points of connection with the helically formed wires being less than required to hold the helically formed wires snug against the core whereby the helically formed wires are flexed radially outward from the core to make the cluster resiliently radially constractible for effective frictional engagement with the cooperating socket connector.*

References Cited by the Examiner

The following references, cited by the Examiner, are of record in the patented file of this patent or the original patent.

UNITED STATES PATENTS

| | | | |
|---|---|---|---|
| 2,032,847 | 3/36 | Kleinmann et al. | 339—252 |
| 2,036,759 | 4/36 | Kleinmann | 339—252 |
| 2,389,951 | 11/45 | Brickman | 29—461 X |
| 2,700,206 | 1/55 | Gilbert | 29—155.55 |
| 2,727,299 | 12/55 | Klumpp | 29—155.55 |

FOREIGN PATENTS

| | | |
|---|---|---|
| 711,998 | 7/31 | France. |
| 669,220 | 12/38 | Germany. |
| 675,781 | 5/39 | Germany. |
| 924,278 | 2/55 | Germany. |
| 331,110 | 6/30 | Great Britain. |
| 584,027 | 1/47 | Great Britain. |
| 217,599 | 2/49 | Switzerland. |
| 220,308 | 6/42 | Switzerland. |

JOSEPH D. SEERS, *Primary Examiner.*